Dec. 7, 1965   F. P. HANRAHAN   3,222,193
METHOD OF SPRAY DRYING LIQUID FOOD PRODUCTS
Filed Sept. 12, 1962

F. P. HANRAHAN
INVENTOR

BY R. Hoffman
ATTORNEY

3,222,193
METHOD OF SPRAY DRYING LIQUID FOOD PRODUCTS
Francis P. Hanrahan, Silver Spring, Md., assignor to the United States of America as represented by the Secretary of Agriculture
Filed Sept. 12, 1962, Ser. No. 223,599
9 Claims. (Cl. 99—203)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of my application bearing Serial No. 124,293, filed July 5, 1961, now abandoned.

This application relates to the spray drying of liquid foods.

Cottage cheese whey, a by-product of the dairy industry, contains nutritive material of value for inclusion in human and animal food products. More extensive use of this whey would be made if a satisfactory, efficient means of drying, without impairment of nutritive value, were provided. Cottage cheese whey contains hygroscopic materials, especially lactic acid, which interfere with removal of water, and spray drying of concentrated cottage cheese whey without the use of a non-hygroscopic additive as a drying aid has heretofore been unsuccessful. The incompletely dried particles settle and adhere to the walls of the spray dryer, giving a sticky, lumpy product. This cannot be prevented by increasing the temperature of the air in the dryer as the cottage cheese whey solids become burnt or scorched and a large part of the nutritive value of the whey is destroyed.

Other liquid foods also present spray drying problems. Many fruit juices are highly acidic. Fat-containing foods such as whole milk are apt to form in particles which adhere to each other and to the surface of the dryer and of containers.

An object of the present invention is to provide a process for spray drying highly acidic liquid foods. Another object is to provide a spray drying process for producing free-flowing powders from liquid foods having high fat or high acid content. A further object is to provide a process for spray drying liquid foods under relatively mild temperature conditions, thus conserving nutritive value of the food product. Other objects and a fuller understanding of the invention may be had by referring to the following description and claims, taken in conjunction with the accompanying drawing in which—

Figure 1:
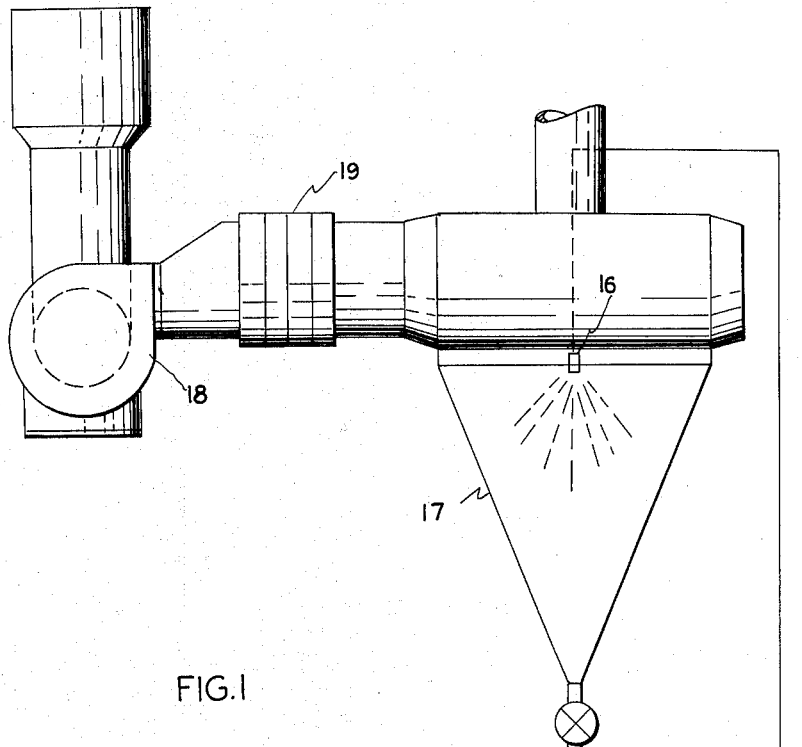
Figure 2:
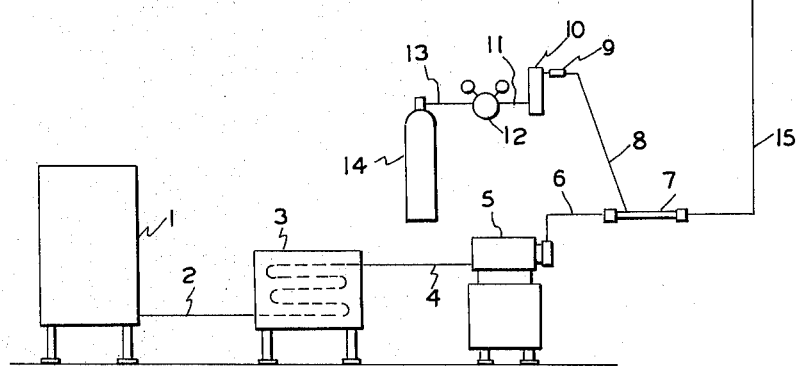
Figure 2:
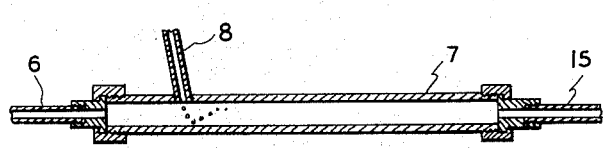

FIGURE 1 is a schematic layout of apparatus suitable for carrying out the invention; and FIGURE 2 is a perspective section illustrating the gas injector and mixer (7) of FIGURE 1.

In general according to the present invention a liquid food is pasteurized, concentrated to about 40 to 50% solids to produce a liquid food concentrate, the concentrate is forced under a first pressure into a mixing zone, an inert, relatively insoluble gas at a pressure in excess of the first pressure is injected into the concentrate in the mixing zone to produce in the mixing zone a concentrate uniformly supersaturated with respect to the gas, and the gas-concentrate mixture is conducted to a spray drying zone and spray dried.

In the process of the present invention there is a marked decrease in the bulk density of the particles to be dried compared to the density of the particles in the normal spray drying process. This lowered density is obtained by spraying a concentrated liquid food into the drying chamber as relatively large droplets of foamy or puffed material. The present invention teaches a new method of foam preparation by injecting gas into the liquid to be dried an instant before the newly formed foam is actually sprayed. When gassing or foam production in the concentrate before drying is achieved as in the present process the particles remain in orbit for relatively long periods of time, thus providing unique drying results. Particularly outstanding is that unmodified cottage cheese whey, heretofore impossible to spray dry, can, by the present process, be obtained as a free-flowing powder. The process is demonstrated to be applicable to spray drying acidic liquid foods such as tomato, grapefruit, and orange juices; fat-containing liquid foods such as whole milk; and hence represents an improved spray drying process for liquid foods in general.

A typical illustration of apparatus for practicing the present invention is described with reference to the accompanying drawing.

As seen in FIGURE 1, concentrate from supply tank 1 is conducted by means of connection 2 to heater or forewarmer 3 and then through connection 4 to a high pressure reciprocating pump 5. Pump 5 forces the prewarmed concentrate through connection 6 to gas injector and mixer 7. The latter is connected through pipe 8 to a check valve 9 which is connected, in turn, to a high-pressure gas supply system 14 through rotometer 10 (for measuring gas flow), connector 11, pressure regulating valve 12, and connector 13. The outlet of the gas injector and mixer 7 is connected by means of pipe 15 to spray nozzle 16 inside spray dryer 17. Air, furnished by blower 18, is heated to a temperature suitable for drying the gas-concentrate spray, by passing through heating unit 19 prior to being blown into dryer 17.

FIGURE 2 shows an enlarged cross-sectional view of the gas injector and mixer 7. The injection of the gas causes extreme turbulence within the mixing chamber, thus insuring thorough mixing and dispersion, thereby preventing slugging by the spray nozzle.

The introduction of gas into the product before entering a high pressure reciprocating pump will cause erratic pumping if the gas is not totally absorbed and uniformly dispersed, whereas the injection of gas after the product leaves the pump will permit uniform pumping regardless of the amount of gas incorporated. This is an important aspect of the invention since it is difficult or impossible to pump a gas-liquid mixture smoothly without having pulsations thereby causing erratic spraying. Introduction of the gas between the pump and the spray avoids this difficulty. Furthermore, incorporation of the gas under high pressure between the pump and the spray causes the formation of very finely dispersed gas droplets which gives a much smoother and more stable foam than can be produced by mechanically making the foam before the liquid is fed to the pump.

The powder produced by this novel process is free-flowing with flow characteristics similar to those of a liquid. This allows it to travel freely through powder collection systems without adherence to metal surfaces. This characteristic is unique in certain powders made according to my invention, especially those of high fat or high acid content such as dried whole milk or high acid dried whey. Such new powders pour well from bulk containers and have little or no angle of repose when poured on a flat surface compared to the peak or high angle of repose of the same materials dried by usual methods.

Concentrates for use in the preparation of food products are prepared by conventional procedures of pasteurization, homogenization if required, and removal of water by standard economical procedures such as vacuum pan evaporation, to a degree of concentration which will allow free pumping, preferably to about 40 to 50% solids. Pumping is facilitated by forewarming (preheating) the concentrate, preferably at a temperature between approximately 130° F. and 190° F.

The pressures used, volumes of liquid treated, and size of orifice and spray dryer are matters of engineering design and can be varied within the scope of this invention as will be obvious to those skilled in the art.

The temperature of the dryer air should be that sufficient to produce a dry, free-flowing powder, yet insufficient to cause heat damage of the product. This is a variable partially dependent on other factors of spray dryer design and operation. The process is demonstrated to be operative with dryer at about 190° F. when spray drying fruit juices and in the range of about 250 to 270° F. for the milk products.

The equipment used is simple and inexpensive. The metering of the gas depends on the product flow rate and is easily controlled. There are no moving parts involved. The mixing chamber is immediately accessible to washing and brushing and the interior of the chamber is easily flushed out or otherwise cleaned.

Although nitrogen is a preferred gas for mixing with the concentrate to be spray dried, other gases which do not adversely affect the concentrate may be employed. In drying cottage cheese whey, air may be used.

Examples 1, 3, 4, and 6 to 8 are presented to illustrate the practice of the present invention, but are not intended to be in limitation thereof. Examples 2 and 5 are included for comparative purposes.

*Example 1*

Cottage cheese whey was pasteurized and concentrated in a vacuum pan evaporator to 45% solids. The concentrate had a pH of 4.0.

The concentrate was heated at about 130° F. and pumped with a high pressure reciprocating pump operating at 1800 p.s.i.g. (pounds per square inch gauge) into the gas injector and mixing chamber. Nitrogen gas was injected into the gas injector and mixing chamber using 2000 p.s.i.g. pressure at a uniform rate. The combined flow of gas and whey concentrate mixture was sprayed into the dryer. The spray dryer was a commercially available nine-foot model of a cyclone type as described beginning on page 414 of Advance in Food Research, vol. II, Academic Press Inc. (1949). The concentrate flow rate into the mixer was 60 gallons per hour and the gas flow rate was 120 standard cubic feet (at 2000 p.s.i.g.) per hour. The nozzle opening was 0.040" diameter. The temperature of the dryer air was 270° F.

The product was a free-flowing powder with a moisture content of 2.40%, a density of 0.21, and particle size ranging from 200 microns (65%) down to less than 50 microns (10%).

*Example 2*

This example is included as a negative control to illustrate results when one does not employ the process of the present invention.

The procedure of Example 1 was followed with the exception that no nitrogen gas was injected into the concentrate before spray drying. The dryer soon became completely clogged with damp whey solids and operation had to be suspended.

Cottage cheese whey of about pH 4.5 is somewhat easier to dry by the new process than more acid whey as illustrated in the following example.

*Example 3*

The cottage cheese whey concentrate had a solids content of 45% and a pH of 4.5. The drying process was performed as described in Example 1 with the exception that the temperature of the dryer air was 260° F.

The dry, free-flowing product had a moisture content of 1.20%, a density of 0.20, and the particle size ranged from 204 microns (60%) down to less than 68 microns (10%).

When applied to concentrated whole milk, the process of the present invention results in a product of improved particle size, as illustrated by comparison of products of Examples 4 and 5.

*Example 4*

Pasteurized, homogenized whole milk was concentrated to 50% solids and spray dried as in Example 1 with the exception that the nozzle opening was 0.0465" in diameter and the temperature of the dryer air was 255° F.

The dried product contained 2.0% moisture and had a density of 0.25. Particles not agglomerated averaged 170 microns in diameter. Approximately 75% of the particles were agglomerated and averaged about 750 microns across the particle axis.

*Example 5*

In this control for Example 4 all factors were identical with the exception that no nitrogen gas was injected into the concentrate.

The dried particles, ranging from 28 to 64 microns in size, contained 3.2% moisture and had a density of 0.5.

*Example 6*

Tomato juice, pasteurized and concentrated to 45% solids, was spray dried in a manner similar to that used in Example 3. The product was a free-flowing powder, although the temperature of the dryer air, 260° F., caused discoloration. As demonstrated in the following example, acidic fruit juices can be dried in the process of the present invention using dryer air at markedly lower temperatures.

*Example 7*

Concentrated grapefruit juice obtained from a commercial source was adjusted to 45% solids and forewarmed to 130° F. The forewarmed concentrate was pumped with a high pressure reciprocating pump operating at 1800 p.s.i.g. (pounds per square inch gauge) into the gas injector and mixing chamber. Nitrogen gas was injected into the gas injector and mixing chamber using 2000 p.s.i.g. pressure at a uniform rate. The combined flow of gas and grapefruit juice concentrate was sprayed into the dryer described in Example 1. The concentrate flow rate into the mixer was 25 gallons per hour and the gas flow rate was 120 standard cubic feet per hour. The nozzle opening was 0.025" diameter. The temperature of the drying air was 190° F.

The grapefruit juice powder had a moisture content of 2 to 3% and particle size ranging from 30 to 100 microns.

*Example 8*

Orange juice concentrate at 45% solids was spray dried following the procedure and conditions of Example 7 and gave an orange juice powder with moisture content and particle size similar to that of the grapefruit juice powder.

Microscopic examination of the particles from the various examples showed them to be generally sphere-shaped, foamed or puffed material or agglomerates of two or more spheres of foamy solids.

The products of the process of the present invention have the advantages of larger particle size, important in ease of reconstituting the dried product, and of more complete removal of water under any given condition of dryer temperature, thus providing a more stable product.

I claim:

1. A process for drying a liquid food comprising pasteurizing the liquid food, concentrating the liquid food to about from 40 to 50% solids to produce a liquid food concentrate, forcing the concentrate under a first pressure of about 1800 p.s.i.g. into a mixing zone, injecting an inert relatively insoluble gas at a pressure in excess of said first pressure into the concentrate in the mixing zone to produce in the mixing zone a concentrate in which the gas is uniformly dispersed, then conducting the gas-concentrate mixture by means of the existing pressure to a spray drying zone, and spray drying the gas-concentrate mixture to produce a dry, free-flowing powder.

2. A process for drying a liquid food comprising pasteurizing the liquid food, concentrating the liquid food to about from 40 to 50% solids to produce a liquid food concentrate, forcing the concentrate under a first pressure of about 1800 p.s.i.g. into a mixing zone, injecting an inert relatively insoluble gas at a pressure in excess of said first pressure into the concentrate in the mixing zone to produce in the mixing zone a concentrate in which the gas is uniformly dispersed, then conducting the gas-concentrate mixture by means of the existing pressure to a spray drying zone, and spray drying the gas-concentrate mixture at a temperature sufficient to produce a dry, free-flowing powder, but insufficient to cause heat damage to the product.

3. The process of claim 2 in which the liquid food is a lacteal fluid and the temperature of spray drying the gas-concentrate mixture is in the range of about from 250° to 270° F.

4. The process of claim 3 in which the liquid food is cottage cheese whey and the product is an edible, dry, free-flowing cottage cheese whey powder.

5. The process of claim 3 in which the liquid food is whole milk and the product is an edible, dry, free-flowing whole milk powder.

6. The process of claim 2 in which the liquid food is a fruit juice and the temperature of spray drying the gas-concentrate mixture is about 190° F.

7. The process of claim 6 in which the fruit juice is tomato juice.

8. The process of claim 6 in which the fruit juice is orange juice.

9. The process of claim 6 in which the fruit juice is grapefruit juice.

References Cited by the Examiner
UNITED STATES PATENTS

| | | | |
|---|---|---|---|
| 1,406,381 | 2/1922 | Heath et al. | 99—203 |
| 2,771,364 | 11/1956 | Chase et al. | 99—71 |
| 2,788,276 | 4/1957 | Reich et al. | 99—71 |
| 2,858,226 | 10/1958 | Kauffman et al. | 99—206 |
| 2,964,407 | 12/1960 | Sinnamon et al. | 99—56 |
| 3,082,098 | 3/1963 | Bergquist | 99—205 X |

A. LOUIS MONACELL, *Primary Examiner.*